Apr. 24, 1923.
P. Y. VEEDER
1,452,629
BERRY PICKING MACHINE
Filed Aug. 8, 1917    3 Sheets-Sheet 2
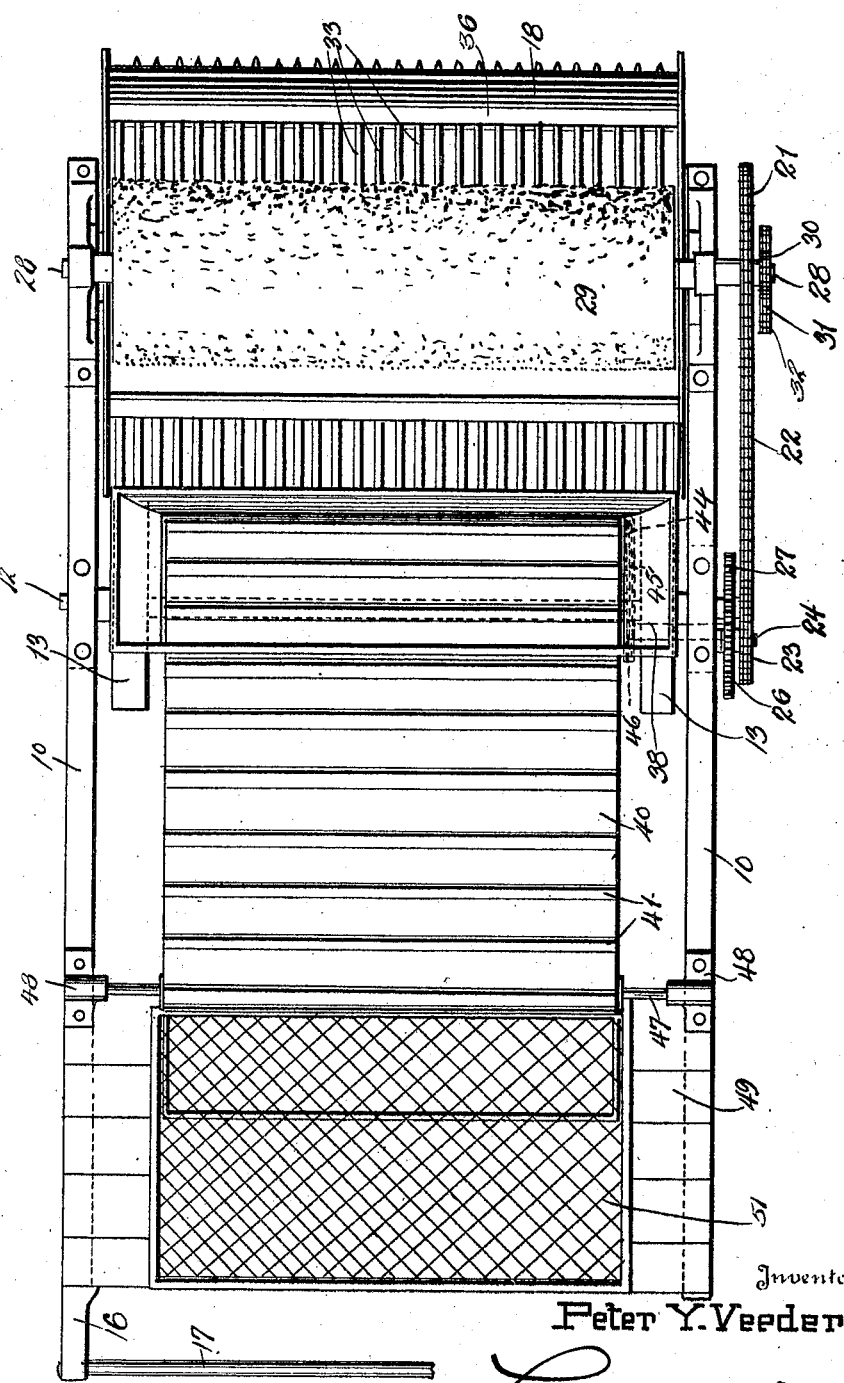
Inventor
Peter Y. Veeder
By Lancaster and Allwine
his Attorneys Apr. 24, 1923.  
P. Y. VEEDER  
1,452,629  
BERRY PICKING MACHINE  
Filed Aug. 8, 1917  
3 Sheets-Sheet 3
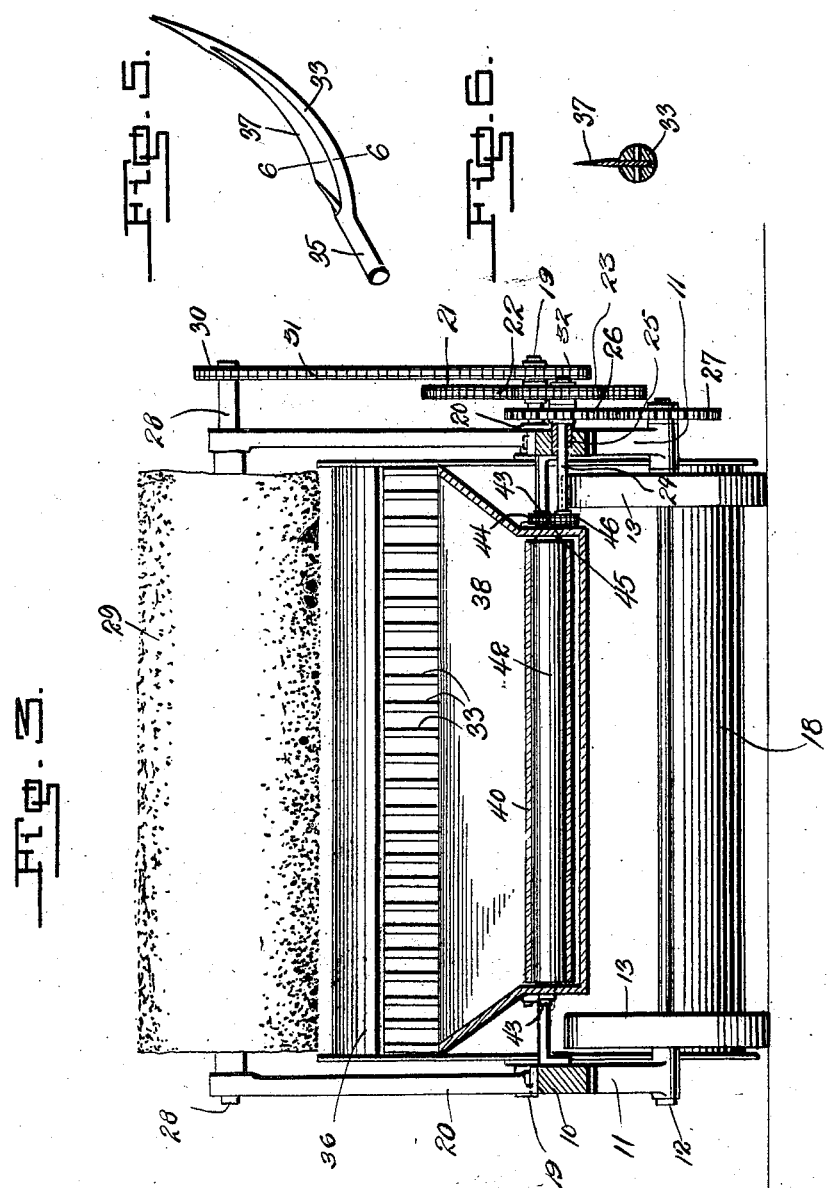
Inventor  
Peter Y Veeder Patented Apr. 24, 1923.

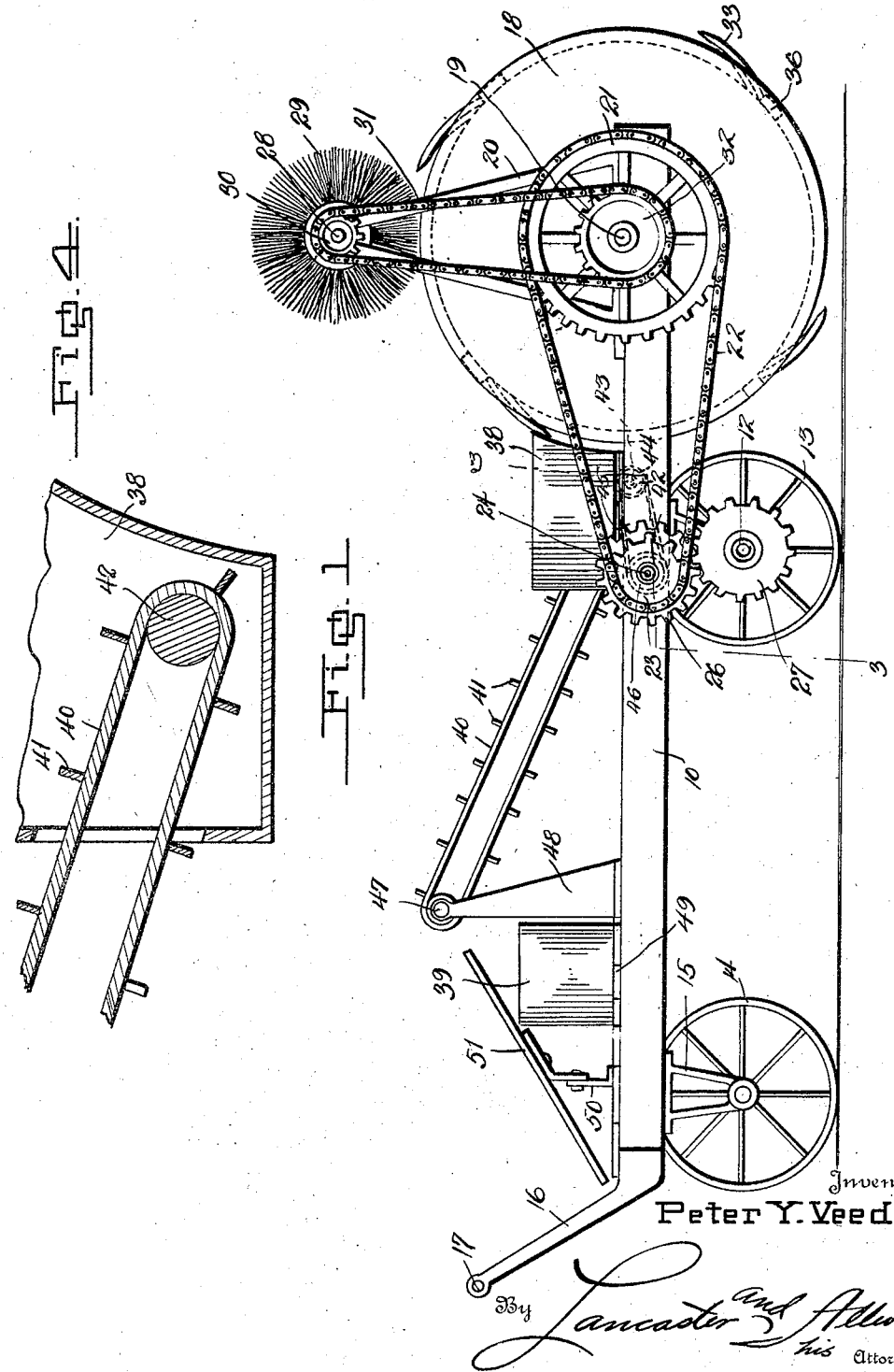

1,452,629

UNITED STATES PATENT OFFICE.

PETER Y. VEEDER, OF TOMS RIVER, NEW JERSEY.

BERRY-PICKING MACHINE.

Application filed August 8, 1917. Serial No. 185,124.

*To all whom it may concern:*

Be it known that I, PETER Y. VEEDER, a citizen of the United States, and a resident of Toms River, in the county of Ocean and State of New Jersey, have invented a certain new and useful Improvement in a Berry-Picking Machine, of which the following is a specification.

The present invention relates to a machine for picking berries and the like, and more particularly for picking cranberries.

An object of the present invention is to provide a relatively simply constructed machine which may be pushed by hand or other means over the ground; which is provided with means for engaging the berries and separating the same from the vines; and which is adapted to deposit the berries in crates or boxes which may be interchangeably placed upon the platform of the machine.

The invention further aims at the provision of a machine of this character provided with a rotating drum and pluralities of teeth of novel construction adapted to sever or cut the stems of the berries from the vines and the like; and which has the teeth so arranged upon the forward end of the machine that the berries are not crushed or destroyed by passage of any part of the machine, or by the operator, or draft animals during operation.

The above, and various other objects and advantages of this invention will be in part described, and in part understood, from the following detailed description of the present preferred embodiment, the same being illustrated in the accompanying drawings wherein:

Figure 1 is a side elevation of a berry picking machine constructed according to the present invention.

Figure 2 is a top plan view of the same.

Figure 3 is a transverse section through the machine taken on a plane indicated substantially by the line 3—3 in Fig. 1.

Figure 4 is a detail enlarged fragmentary section through the berry receiving hopper and the adjacent end portion of the conveyor.

Figure 5 is a detail perspective view, enlarged, of one of the teeth employed.

Figure 6 is a transverse section taken on the line 6—6 of Fig. 5.

Referring to the drawings, wherein similar parts are designated by like characters of reference throughout the several views, 10 designates a frame which is arranged substantially horizontally and which is of substantially U-shape with its open end forward. Arranged in transverse register, and at each side of the frame intermediate the front and rear ends thereof, is a pair of depending brackets 11 in the lower ends of which is journaled a drive shaft 12. The shaft 12 is provided near its opposite ends with a pair of traction carrier wheels 13 fixed to the shaft 12 and adapted to rotate the latter upon the movement of the machine.

The rear end of the frame 10 is preferably supported upon a pair of wheels 14 mounted in depending brackets 15 secured to the frame. The rear end of the frame is also provided with a pair of upstanding and rearwardly inclined arms 16 upon the upper ends of which is supported a transversely extending handle 17. The frame 10 may thus be pushed by hand, or may be propelled in any other suitable manner.

Mounted in the forward end of the frame 10 is a transversely extending relatively large drum 18 mounted upon a transverse shaft 19 which is journaled in brackets 20 secured to the opposite sides of the frame 10. The drum 18 is adapted to be driven from the shaft 12, and for this purpose the shaft 19 is provided upon one end with a relatively large sprocket gear wheel 21 over which a belt or chain 22 is trained. The chain 22 passes over a smaller sprocket wheel 23 which is fixed to a counter-shaft 24 mounted in a bearing 25 in the adjacent side of the frame 10. The countershaft 24 is provided with a spur gear wheel 26 which meshes with a correspondingly formed gear wheel 27 carried upon the drive axle 12. When the machine is moved forwardly, the carrier wheels 13 turn in a forward direction, and the intermeshing spur gear wheels 26 and 27 rotate the counter-shaft 24 in a backward direction and consequently drive the drum 18 in a backward direction.

The brackets 20 are in the form of castings which rise at the opposite sides and at the forward end of the frame 10, and journaled in the upper ends of the castings or brackets 20 is a brush shaft 28 which extends transversely over the forward end of the frame and over the drum 18. A brush 29 is mounted upon the intermediate portion of the shaft 28 and is of a length equal substantially to that of the drum 18. The brush shaft 28 is provided at said side of the frame with a relatively small sprocket pinion 30 over which is trained a chain 31, the latter extending downwardly and passing over a larger sprocket wheel 32 which is fixed to the drum shaft 19 at said side of the frame. The brush 29 is therefore driven in the same direction as is the drum 18, and is turned at a relatively greater speed.

The drum 18 is provided in its periphery with a plurality of circumferentially spaced apart longitudinal rows of teeth 33. Each tooth 33, as shown in detail in Fig. 5, is provided with a shank portion 35 adapted to be riveted, clamped or otherwise suitably secured in a longitudinally extending retaining bar 36 secured to the outer surface of the drum 18. The body of the tooth 33 is arched or bowed outwardly from the peripheral surface of the drum, and extends circumferentially of the drum. The body of the tooth 33 is pointed at its extremity and is adapted to engage the stems and vines of the berries and remove the berries therefrom. The inner concaved faces of the teeth 33 are provided, longitudinally, with cutters or knives 37 which are greater in depth at the shank end portion of the teeth, and which gradually decrease and merge into the body portions of the teeth near their pointed extremities. An inclined or beveled cutting edge is thus provided within the hollow sides of the teeth and over which the stems and vines are adapted to be drawn by the rotation of the drum for the purpose of severing the vines and stems from the berries as the latter are raised by the teeth. Each row of teeth is arranged substantially in parallelism with the axis of rotation of the drum, and the drum 18 and the rows of teeth are of greater transverse length than the tread of the wheels 13. The berries are thus picked from the vines before the wheels 13 and the frame 10 pass over the vines. In this manner, the berries are preserved from crushing, and the like, incident to the passage of the machine and the operator over the berries.

During the operation of the drum certain portions of the stems and the vines are accidentally carried upwardly on the drum by the teeth 33, and the brush 29, which rotates in such direction as to have a peripheral surface movement opposite from that of the drum 18, engages the vines and stems and detaches the same from the teeth. As the berries are carried downwardly at the rear side of the drum 18, the berries fall from the teeth 33 and the circumferential movement of the drum causes them to be projected tangentially from the drum into a receptacle or hopper 38, which latter is mounted on the frame 10 immediately in rear of the drum 18. The teeth 33 are spaced in the rows longitudinally of the drum 18 so as to allow stems and analogous foreign material engaged by the brush 29 to pass therebetween but they are sufficiently close to prevent berries from passing therebetween, thereby co-acting with the drum to form pockets for carrying the berries upwardly with the drum and as the teeth extend tangentially from the surface of the drum, they will allow the berries to fall into the receptacle 44 as above specified, after the teeth pass the highest point during the rotation of the drum.

From Fig. 1 of the drawings it will be noted that the forward side or wall of the hopper 38 conforms to the curvature of the drum 18 and is arranged concentric thereto, the receptacle 38 being spaced sufficiently for the drum to admit of the free passage of the teeth 33 downwardly against the forward side of the receptacle. The berries deposited in the receptacle from the drum are further separated and screened and finally delivered into crates or boxes 39 which are arranged upon the rear end of the frame 10.

For the purpose of transferring the berries from the receptacle 38 into the crate 39, an endless conveyer 40 is provided, the same being of any suitable construction, and being shown diagrammatically in the present instance as comprising an endless belt having flights 41 projecting from the outer surface thereof, the flights being of sufficient length to engage in the bulk of the berries deposited in the receptacle and to retain quantities of the berries on the conveyer 40. The conveyer 40 preferably extends through the rear wall of the receptacle 38, and is inclined rearwardly and upwardly from the receptacle. The forward lower end of the conveyer 40 is mounted upon a roller 42 arranged transversely in the receptacle 38, and which is provided with trunnions or a shaft 43 projecting through the receptacle 38 at one side of the frame. The shaft 43 is provided with a relatively small sprocket pinion 44 over which a chain 45 is trained, the chain also passing over a relatively large sprocket wheel 46 mounted upon the counter-shaft 24.

The rear upper end of the conveyer 40 is mounted upon a shaft 47 supported transversely in a pair of upstanding bracket arms 48 carried upon the frame 10. A platform 49 is placed upon the frame 10 immediately in rear of the uprights 48 and is adapted to support the crate 39. The platform 49 is also provided with an upstanding bracket arm 50 arranged near the rear end of the frame 10 and which adjustably supports thereon a screen 51 adapted to overhang the crate or box 39. The screen 51 is of such mesh as to admit the free passage of berries therethrough, and to arrest the passage of vines, stems and the like which still adhere to the berries. The screen 51 is preferably inclined at such an angle that, due to the vibration of the machine when in use, the stems and other matter collected upon the surface of the screen are carried over the crate 39 and dropped upon the ground.

In operation, the machine is pushed forwardly and the traction carrier wheels 13 rotate the shaft 12, and through the train of gears above described, turn the drum 18 and the shaft 19 in a rearward direction. The teeth 33 engage the vines upon and near the ground and catch the berries and draw the same from the vines, the cutting edges 37 working against the stems and vines and severing the same. The berries are carried upwardly, and the brush 29 sweeps the stems and vines still adhering to the berries and the teeth forwardly therefrom, and the berries, owing to the relatively rapid turning of the drum, are then delivered at the rear side of the drum into the receptacle 38 substantially free from stems and vines. The conveyer is continuously operated, as above described, and carries the berries deposited in the receptacle 38 backwardly and upwardly, and dumps the same onto the upper surface of the screen 51. The berries pass through the meshes of the screen into the crate 39 or other receptacle placed upon the platform 49, and any accumulations too large to pass through the meshes of the screen are carried by vibration downwardly over the upper surface thereof and are finally discharged at the rear end of the frame onto the ground.

It is of course understood that the machine may be used for collecting various kinds of berries and the like, but it is more particularly adapted for collecting and separating cranberries, and may be propelled by mechanical means if so desired.

Various changes and modifications may be made in the details of construction of the above specifically described embodiment of this invention without departing from the spirit thereof or from the scope of the following claims.

I claim:—

1. A cranberry harvester comprising a receiver, a rotary frame, one or more picker scoops mounted on said frame so as to strip berries from vines and deliver the berries into said receiver when the frame is rotated, and means for delivering berries from said receiver while the harvester is in operation.

2. A cranberry harvester comprising a rotary drum, a plurality of sets of picker teeth mounted along the periphery of the drum so as to strip berries from vines when rotated therethrough, and a rotary brush for cleaning said teeth at each revolution.

3. In a berry picking machine, the combination of a frame, a drum mounted in the forward end of the frame, means for turning the drum, circumferentially spaced apart rows of teeth arranged upon the drum adapted to engage berry vines and separate berries therefrom, a brush arranged over the drum, means for turning the brush to remove vines and stems from the drum, and a receptacle arranged at the rear side of the drum adapted to receive berries from the teeth thereof.

4. In a berry picking machine, the combination of a frame, a drum mounted in the forward end of the frame, means for rotating the drum in a backward direction, a plurality of transverse rows of teeth arranged in circumferentially spaced apart relation upon the periphery of the drum and extending in a forward direction, said teeth being adapted to engage in berry vines and separate berries from the vines and carry the berries upwardly over the drum, a brush arranged over the drum, means for rotating the brush in contact with the drum to sweep the vines and stems from the teeth when adhering thereto, and a receptacle arranged at the rear side of the drum adapted to receive berries falling from the teeth by gravity.

5. In a berry picking machine, the combination, of a frame, a drum mounted in the forward end of the frame, means for rotating the drum in a backward direction, relatively to the direction into which the machine is adapted to travel circumferentially spaced apart rows of teeth arranged upon the drum adapted to engage the berry vines and separate berries therefrom, and a brush arranged over the drum, and means for turning the brush to remove vines and stems from the drum.

6. In a berry picking machine, the combination of a frame, a drum mounted in the forward end of the frame, a plurality of bars extending longitudinally across the peripheral surface of the drum, and pluralities of teeth secured to said bars and projecting therefrom at substantially a tangent to the periphery of the drum, said teeth being arched outwardly intermediate their ends and having pointed extremities for engagement with vines to sever berries therefrom.

7. In a berry picking machine, the combination of a frame, a drum mounted in the frame, means for rotating the drum, a plurality of circumferentially spaced apart transversely extending bars secured to the peripheral surface of the drum, transverse rows of teeth secured to said bars, each tooth provided with a shank portion secured to its adjacent bar at an angle to dispose the tooth substantially at a tangent to the surface of the drum for forming a pocket between the drum and the tooth, the tooth having an outwardly arched intermediate portion and a pointed extremity, each tooth also having at its inner concaved side a longitudinally extending knife edge for cutting vines and stems.

8. In a berry picking machine, the combination of a berry receptacle, a rotatable drum, pluralities of picking teeth carried by said drum and projecting therefrom with their longitudinal axes disposed at substantially a tangent to the periphery of the drum, said teeth being arched outwardly intermediate their ends and having their extremities shaped to sever the berries from the vine, said picking teeth adapted to retain the berries until the respective teeth reach a predetermined position during the rotation of the drum, when the berries will be released to roll into said berry receptacle.

9. In a berry picking machine, the combination of a berry receptacle, a rotatable drum, pluralities of picking teeth carried by said drum and projecting therefrom with the longitudinal axis disposed at substantially a tangent to the periphery of the drum, said teeth being arched outwardly intermediate their ends and having their extremities shaped to sever the berries from the vine, said teeth further adapted to retain the berries until the respective teeth reach a predetermined position during the rotation of the drum when the berries will be released to roll into said berry receptacle, and means positioned above said drum for separating leaves from the berries, and means operable by the rotation of the drum to operate said separating means.

PETER Y. VEEDER.